Figure 1:
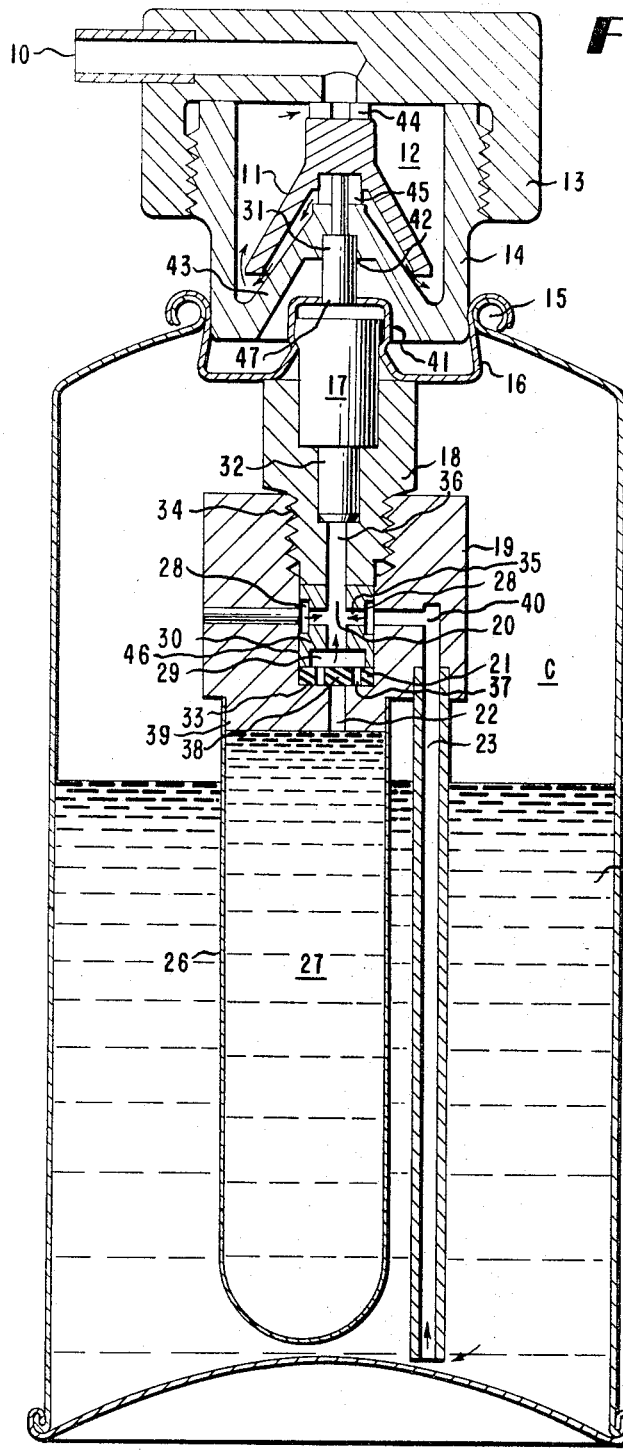

June 13, 1967  W. D. LEWIS  3,325,056

APPARATUS FOR CODISPENSING A PLURALITY OF LIQUIDS

Filed Feb. 23, 1966

INVENTOR
WILLIAM DEIN LEWIS

Melville J. Hayes
AGENT

United States Patent Office 3,325,056
Patented June 13, 1967

3,325,056
APPARATUS FOR CODISPENSING A PLURALITY OF LIQUIDS
William D. Lewis, Wilmington, Del., assignor to E. I. du Pont de Nemours and Company, Wilmington, Del., a corporation of Delaware
Filed Feb. 23, 1966, Ser. No. 529,526
6 Claims. (Cl. 222—94)

This invention relates to a dispenser adapted for storing at least two different liquid materials in isolation from each other and for the intermittent dispensing of these materials in contact with each other.

The invention provides an apparatus which can be used for the codispensing of liquids and other fluid materials which are very reactive with each other at ordinary room temperature. The dispenser is especially useful for the instantaneous preparation of warm shaving lather.

Expressed broadly, the novel dispenser of this invention comprises an outer container (A) adapted for storing a liquid under pressure and having an aperture in the wall of its upper portion in which is sealingly fastened a dispensing valve, said dispensing valve having an upper tubular portion communicating with a dispenser outlet and a lower tubular portion terminating inside said container, a tubular retainer within said container having an upper end portion within which the lower portion of said dispensing valve is sealingly and coaxially fitted, and having a lower end portion to which is sealingly attached an inner conttainer (B) within and smaller than container (A) whereby there is provided a chamber (C) which is outside of (B) and within (A), said tubular retainer having an inner wall within its lower portion defining a duct which communicates with the interior of container (B), and having an inner wall above said duct defining a counterbore cavity whose bottom forms a laterally extending annular shoulder around the upper end of said duct, a secondary valve sealingly fitted in the bottom of said counterbore cavity and adapted to remain closed and thereby seal said duct when container (B) contains pressurized liquid except when said dispensing valve is open, a tubular blender sealingly and coaxially fitted in said counterbore cavity atop said secondary valve and having a vertical canal in communication with the lower tubular portion of the dispensing valve and the upper portion of said secondary valve, said blender having a lateral channel through its side wall, the side wall of said tubular retainer having a channel terminating inside said retainer in communication with the lateral channel of said blender and terminating outside said retainer in communication with the upper end of a tube sealingly attached to said retainer and mounted in chamber (C) so that its lower end communicates with the lower portion of chamber (C);

the interiors of container (B) and chamber (C)—when containing pressurized liquid—being in communication with the dispenser outlet when said dispensing valve is open.

The inner container (B) is preferably a collapsible container.

The tubular retainer of the novel dispenser can consist of an upper tubular member and a lower tubular member, the lower portion of the upper member being coaxially and sealingly fitted within the upper portion of the lower member, for example by means of matching threads. The lower end of the upper member preferably sealingly abuts upon the upper end of the tubular blender.

The invention will be more readily understood by reference to the attached drawing wherein FIGURE 1 shows an embodiment of the novel dispenser in central vertical section (except that the dispensing valve is shown in front view).

Figure 2:
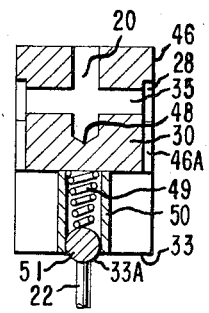
Figure 3:
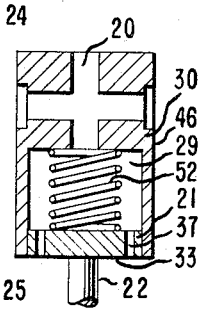
Figure 4:
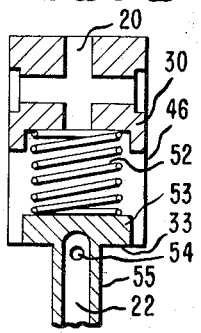

FIGURES 2, 3 and 4 illustrate in central vertical section how the design of the secondary valve 21 and blender 30 within retainer 19 of FIGURE 1 can be varied within the scope of the present invention.

In FIGURE 1, outer container 24 (referred to above as container A), which is adapted for storing a liquid under pressure, is a can of the type commonly used in aerosol foam dispensers. The upper portion of can 24 is rounded and tapered to form a circular opening surrounded by a rolled bead 15 spun from the metal of the can. The rolled edge of bowl-shaped cover 16 tightly engages bead 15, and (after the inner components of the dispenser are inserted) it is crimped therewith to form a pressure-proof seal.

The central dome-shaped portion 41 of cover 16 is in clamping telescopic attachment with the casing of dispensing valve 17, a type of self-closing dispensing valve commonly used in aerosol dispensers. Cover 16 has a central aperture 47 in which valve 17 is sealingly fastened so that upper tubular valve stem 31 has its lower end at the level of said aperture. Valve 17 is held shut by a compression spring (not shown) within the valve casing. Upper stem 31, which supports dispenser cap 13, projects into chamber 12 (referred to as chamber D in claim 6) within the cap through a central hole 42 in the dome-shaped bottom wall 43 of the cap.

Dome-shaped baffle 11 is mounted just above and coaxial with bottom wall 43 so that the central portion of the baffle is clampingly secured between upper (44) and lower (45) diametrically-slotted and centrally-perforated washers. Lower washer 45 permits liquid to flow from upper stem 31 into chamber 12 beneath baffle 11 as indicated by the arrows. Upper washer 44 permits liquid to flow from chamber 12 into dispenser outlet 10 in the upper wall of cap 13. The cap is made so that its top portion can be removed by unscrewing it from cap side wall 14.

Thus, chamber 12 communicates with the interior of upper stem 31 and with outlet 10; and it is adapted for storage of a charge of particles (e.g., a catalyst) or other porous material through which liquid can pass en route from stem 31 to outlet 10.

Tubular retainer (18–19) within can 24 consists of an upper tubular member 18 and a lower tubular member 19. The lower portion of member 18 has external threads 34 which match the internal threads of the upper portion of member 19, the former being coaxially and sealingly fitted in the latter. Member 18 is counterbored from the top, and the lower portion of valve 17, including stem 32, is sealingly and coaxially fitted therein. The inner wall of the lower portion of member 18 defines a channel 36 extending downward from and communicating with the interior of stem 32.

Collapsible inner container 26 (referred to above as container B) is a flexible plastic tube which is smaller than can 24, and its upper end is sealingly and telescopically attached to the rabbetted lower exterior portion 39 of retainer member 19. Thus, there is a chamber (referred to above as chamber C and shown in FIGURE 1 as C) outside of tube 26 and within can 24 in which liquid 25 can be stored in isolation from liquid 27 in tube 26.

Retainer member 19 has an inner wall within its lower portion defining duct 22 which communicates with the interior of tube 26. And member 19 has an inner wall above duct 22 defining a counterbore cavity 46 whose bottom forms at laterally extending annular shoulder 33 around the upper end of duct 22.

Flexible rubber disc 21 (referred to above as a secondary valve) is a self-closing valve means sealingly fitted at the bottom of cavity 46. Valve 21 is adapted to remain closed and thereby to seal duct 22 when tube 26 contains pressurized liquid and dispensing valve 17 is closed. Valve 21 is also adapted to open and thereby to make duct 22 communicate with stem 32 when tube 26 contains pressurized liquid and dispensing valve 17 is opened. The operation of valve 21 is described in further detail below. Valve 21 is perforated with four vertical channels 37 which communicate with recess 29 above valve 21 and which are sealed (when valve 21 is closed) by annular shoulder 33. Valve 21 has the general configuration of a 4-hole button, channels 37 being equidistant from each other and equidistant from the center of the valve. The diameter of the solid central portion 38 of valve 21 is greater than the diameter of duct 22.

Tubular blender 30 is sealingly and coaxially fitted in counterbore cavity 46 atop valve 21. Vertical canal 20 of the blender is in communication with stem 32 and the top of valve 21. Blender 30 has a lateral (diametrically bored) channel 35 through its sidewall and an annular groove 28 in its outer wall communicating with channel 35. Groove 28 provides communication between channels 35 and 40 even when blender 30 is rotated on its axis so that the two channels no longer lie in the same vertical plane. The lower end of retainer member 18 sealingly abuts upon the upper end of blender 30. The inner wall of the lower portion of blender 30 defines a counter bore recess 29 which communicates with channels 37 as indicated above. The lower end of blender 30 sealingly and lockingly abuts upon the peripheral portion of valve 21.

The side wall of retainer member 19 has a channel 40 terminating inside member 19 in communication with lateral channel 35 of blender 30 and terminating outside member 19 in communication with the upper end of tube 23. Tube 23 is mounted vertically in chamber (C) so that its upper end is sealingly attached to the lower end of member 19 in communication with channel 40, and so that its lower end communicates with the extreme lower portion of chamber (C); thus, the lower end of tube 23 nearly touches the bottom of can 24.

The dispenser shown in FIGURE 1 is adapted for storing liquid 25 (including a propellant) in can 24 (chamber C) and a different liquid 27 in tube 26, and for dispensing these two liquids simultaneously and intermittently through outlet 10. It is also adapted for storing material in chamber 12 in the form of particles (e.g., a catalyst), fibers, a solid porous mass or other material porous enough to permit liquid to pass through it, and for passing the aforementioned liquids through chamber 12 in contact with said material en route to outlet 10. The particles or other material in chamber 12 can be a material capable of modifying or reacting with either or both of the liquids passing through valve 17.

When using the dispenser, it is agitated briefly to insure that the liquid component in each chamber is properly mixed; cap 13 is depressed to open valves 17 and 21; and liquids 25 and 27 become mixed as they flow into channels 20 and 36 en route to outlet 10. The flow of both liquids into channel 20 stops the instant valve 17 is permitted to close and starts again the instant valve 17 is opened.

Various modifications of the dispenser described above which will be obvious to one skilled in the art in view of the present disclosure can be made without departing from the spirit of the present invention. For example, with reference to FIGURE 1, cap 13 can be omitted; the upper end of stem 31 can serve as the dispenser outlet.

Stems 31 and 32, retainer members 18 and 19, blender 30, tube 23 and cap 13 can be made of any suitable material (e.g., plastic, metal or glass) having sufficient strength, rigidity and resistance to the liquids being dispensed. Valve 21 and collapsible tube 26 can be made of any suitable material having the required flexibility, strength and chemical resistance, for example natural or synthetic rubber or polyethylene. Various known fastening methods can of course be employed (a) for attaching tube 26 to retainer 19 so that the interior of the tube communicates with duct 22, (b) for attaching the top portion of cap 13 to sidewall 14, and (c) for fastening the lower portion of valve 17 within the retainer. One or more collapsible tubes designed to resemble a conventional tooth paste tube can be mounted with their upper ends sealingly fitted within individual channels provided with internal threads to match the external threads of the tubes, and the individual channels can communicate with duct 22.

Valve 21 of FIGURE 1 can be replaced with other known self-closing types of valves adapted to fit at the bottom of cavity 46, to remain closed and thereby seal duct 22 when valve 17 is closed, and to open when valve 17 is opened and thereby permit liquid to flow from duct 22 into channel 20.

Other useful structures for the parts within counterbore cavity 46 of retainer 19 as shown in FIGURE 1 (secondary valve 21 and blender 30) are illustrated in FIGURES 2, 3 and 4.

In FIGURE 2, the secondary valve comprises ball 51 which rests sealingly and releasably atop duct 22 within recess 33A (provided in the central portion of annular shoulder 33) whose curvature matches that of the ball. Canal 20 terminates within the lower portion of blender 30 at point 48. When dispensing valve 17 (see FIGURE 1) is opened, liquid 27 (a) moves up duct 22 forcing ball 51 upwards within slotted tube 50 against conical coil spring 49, (b) passes laterally through radial slots (not shown) in the sidewall of tube 50, and (c) flows through vertical slots 46A (which communicate with vertical canal 20) in the sidewall of the lower portion of blender 30 into canal 20 by way of groove 28 and channel 35. When dispensing valve 17 is allowed to close, ball 51 returns to its original position in recess 33A to seal duct 22.

In FIGURE 3, the secondary valve comprises disc 21 which rests sealingly and releasably on annular shoulder 33 and which is fitted to move up and down within counterbore recess 29 without tilting. The lower end of blender 30 abuts on the peripheral portion of shoulder 33. When dispensing valve 17 is opened, liquid 27 (a) flows up duct 22 forcing disc 21 upwards within counterbore recess 29 of blender 30 against cylindrical coil spring 52, (b) flows through vertical channels 37 by way of the resulting gap between the bottom of disc 21 and shoulder 33, and then (c) flows into vertical canal 20 by way of recess 29. When dispensing valve 17 is allowed to close, disc 21 returns to its original position on shoulder 33 to seal duct 22.

In FIGURE 4, the secondary valve comprises a piston-like member having a disc-shaped upper portion 53 which rests sealingly and releasably on annular shoulder 33 and a tubular lower portion 55 fitted to move up and down in sliding contact with the wall of duct 22, portion 55 is provided near its top with an orifice 54 adapted to permit duct 22 to communicate with recess 29 when upper portion 53 is lifted out of contact with shoulder 33. When dispensing valve 17 is opened, liquid 27 (a) flows up duct 22 forcing the piston to move up so that portion 53 rises against cylindrical coil spring 52, (b) flows through orifice 54 into vertical canal 20 by way of the resulting gap between the bottom of portion 53 and shoulder 33. When dispensing valve 17 is allowed to close, the piston returns to its original position wherein portion 53 rests in sealing contact with shoulder 33.

A source of fluid pressure is provided by any suitable known means for moving liquids 25 and 27 through channel 20 and outlet 10 when valves 17 and 21 are open. For example, a volatile organic material or a compressed gas referred to in the art as "propellant" can be introduced into can 24, thereby pressurizing both the can and the collapsible tube 26. The useful propellants include those known to be operable in an aerosol-type package, for example, a compressed gas (e.g., nitrous oxide or carbon dioxide), isobutane, straight-chain saturated aliphatic hydrocarbons, and water-insoluble chlorine and fluorine substituted hydrocarbons having a vapor pressure of about 15–85 p.s.i.g. at 21° C. About 3–25% of propellant is usually required based on the combined weight of propellant and other liquid in can 24; however, a substantially greater amount of propellant is used for some applications. The dispenser is preferably shaken briefly to obtain a colloidal dispersion of the propellant in liquid 25 just before opening the valve.

In preferred embodiments of the present invention, inner container (B) is collapsible and propellant is introduced only into outer container A (chamber C); but it is also within the spirit of this invention to use a rigid inner container and to introduce propellant into container (B) as well as container (A).

Filling methods well known in the art can be employed for introducing the propellant and other liquids into the dispenser; for example, the "pressure fill method," the "cold fill method" and the "under-the-cap fill method."

The novel dispenser is useful in a variety of applications where it is desired to store two or more different liquid materials in isolation from each other in a single dispenser and to dispense a mixture of these materials. As illustrated below, the dispenser is especially useful for the substantially instantaneous preparation of warm aqueous foam or lather from two suitably reactive, separately stored liquid compositions for conditioning areas of a person to be shaved. Use of the novel dispenser makes shaving fast, easy and comfortable.

Among the other liquid mixtures which can be dispensed from the dispenser of this invention are adhesive compositions, paint compositions, insecticides, cleaning and bleaching compositions, caulking compositions, heated liniment, whipped cream, polyurethane foam, and multicolored cosmetic creams, food products and tooth paste.

The preparation and use of the novel apparatus for the instantaneous preparation and dispensing of warm shaving lather is illustrated in the following examples wherein all parts and percentages are by weight unless indicated otherwise.

*Example I*

After valve 21 and blender 30 are positioned in retainer 19 as shown in the drawing, the threaded portions of retainers 18 and 19 are screwed together just tightly enough to provide a liquid-tight seal between the periphery of valve 21 and the underlying cavity floor. The lower ring-shaped portion of blender 30 keeps peripheral portion of valve 21 clamped in sealing engagement with the underlying cavity floor.

The dispenser shown in the drawing is prepared for use by first filling can 24 about two-thirds full with a liquid composition composed of a mixture of 5 parts of sodium hypophosphite and 95 parts of an aqueous foamable composition having the following formula:

| Formula A: | Parts by wt. |
|---|---|
| Fibrous boehmite | 4.00 |
| Polyoxyethylene [2] stearyl ether | 2.00 |
| Sorbitol | 10.00 |
| Undecylenyl polypeptidate | 0.08 |
| Sodium lauryl sulfate | 0.12 |
| Water | 83.80 |
| | 100.00 |

The pH value of the Formula A composition is adjusted to 6.0 by adding ammonia. The fibrous boehmite (sometimes referred to as fibrous alumina monohydrate) is described in U.S. Patent 2,915,475; it is composed of fibrils having a length of about 100 millimicrons and a diameter of about 5 millimicrons, and having a specific surface area of about 275 square meters per gram.

The air remaining in the can is replaced with gaseous propellant (the 40/60 mixture described in the next paragraph). After assembling parts 16, 17, 18, 19, 21, 23 and 30 as described above and shown in the drawing, tube 26 is filled with a 30% aqueous solution of hydrogen peroxide and attached to retainer 19. The resulting assembly is placed in position in can 24, and the rolled edge of cover 16 is crimped with bead 15 to form a pressure-proof seal.

Propellant is introduced into can 24 (chamber C) by depressing the upper stem of valve 17 (with cap 13 removed) to open the valve and injecting the propellant under pressure through valve 17, from which it flows into the can by way of channels 20, 35 and 40, and tube 23. Valve 17 is then allowed to close. Valve 21 prevents the propellant from entering tube 26. The propellant consists of a 40/60 mixture of dichlorodifluoromethane and symmetrical dichlorotetrafluoroethane. The amount injected into the can is equivalent to 10% of the combined weight of aqueous foamable composition, sodium hypophosphite and propellant (that is, 10% by weight of liquid 25 of the drawing). The upper portion of can 24 contains propellant vapor under pressure sufficient to force liquids 25 and 27 through the duct system provided, including outlet 10, when valve 17 is open.

With the top wall of cap 13 removed, chamber 12 is filled with a commercial type of sieve catalyst (not shown in the drawing) composed of silica granules coated with 0.5% platinum by weight of silica. The top of the cap is then screwed on so that it tightly engages the top of cylindrical wall 14, and the cap is put in its operating position as shown in the drawing in engagement with the upper stem of valve 17.

Just prior to use, the package is shaken to insure that the components of liquid 25 are adequately blended with one another. None of liquid 27 escapes from tube 26 during the shaking because it is sealed in by valve 21.

A quantity of warm, creamy lather is dispensed from the dispenser at outlet 10 by simply pressing down on cap 13. The temperature of the dispensed lather is 48° C. When a person applies the lather to the hairy areas of the face and neck by means of his fingers or a brush, the lather comfortably and efficiently prepares these areas for shaving.

While valve 17 is held open by depression of cap 13, the separately stored materials within the dispenser (liquids 25 and 27 and the chamber 12 catalyst) come in contact with one another, and the foamable composition flowing towards the outlet becomes heated in the manner described below.

The liquid 25 mixture of foamable composition, sodium hypophosphite and propellant flows up through tube 23 into mixing channel 20 by way of channel 40, groove 28 and channel 35 (see the arrows in the drawing). Simultaneously, the hydrogen peroxide (liquid 27) flows up through duct 22 and into mixing channel 20 (see the arrow in the drawing) by way of (1) a gap created between annular shoulder 33 and the center portion 38 of valve 21, (2) the four holes 37 in valve 21 and (3) recess 29. The gap is created as the upward-rushing pressurized liquid 27 causes the central portion 38 of flexible disc-valve 21 to rise slightly above the cavity floor (shoulder 33) and thereby provide communication between duct 22 and the four holes in valve 21. The relative size of the ducts carrying the two different liquids into channel 20 is such that the resulting blend has a hydrogen peroxide content of 15% (calculated as 100% strength hydrogen peroxide).

The resulting mixture of liquids 25 and 27 flows up through valve 17 and into contact with the catalyst granules in chamber 12 by way of the slotted washer 45 beneath baffle 11 and the narrow space between baffle 11 and the floor 43 of cap 13 (see the arrows in the drawing). While the liquid mixture is en route to chamber 12, the sodium hypophosphite begins to react with the hydrogen peroxide. This reaction proceeds very rapidly as the mixture passes through the bed of catalyst granules. This reaction results in the exothermic non-explosive decomposition of the hydrogen peroxide and resultant heating of the foam-forming mixture. The heated mixture flows in the form of a warm lather through outlet 10 by way of the slotted washer 44 above baffle 11.

*Example II*

A useful warm shaving lather is prepared and dispensed by first preparing an aqueous foamable composition according to the following formula:

Formula B:                              Percent by wt.
  Stearic acid, triple pressed _____ 6.3
  Coconut oil fatty aid _____ 2.7
  Triethanolamine _____ 4.6
  Sorbitol, 70% aqueous solution _____ 10.0
  Water _____ 76.4
                                            ─────
                                            100.0

In preparing Formula B, the first two ingredients are mixed together at 95° C. In a separate container, the water is heated to 100° C. and the third and fourth ingredients are added thereto with stirring. The latter mixture, while still hot, is added gradually with stirring to the heated mixture of the first two ingredients. After heating the resulting Formla B composition for an additional 10 minutes at 95° C., it is cooled to 21° C.

A "Formula C mixture" is prepared by mixing 8 parts of potassium sulfite with 92 parts of Formula B.

The dispenser is prepared for use by first filling can 24 about two-thirds full with the Formula C mixture described above. The can and its contents are placed in a refrigerator until chilled to −25° C.

Parts 16–19, 21, 23 and 30 are assembled as described above and shown in FIGURE 1. Before this assembly is attached to the can, tube 26 is filled with 7% hydrogen peroxide and attached to the bottom of retainer 19. With the can and its contents at −25° C., a propellant mixture as described in Example 1, chilled to −25° C., is introduced into the can in an amount equal to 8.5% of the combined weight of Formula C mixture and propellant.

Now the assembly described in the previous paragraph is placed in position with the cover fitted on the can, and the rolled edge of cover 16 is crimped with can bead 15 to form a pressure-proof seal. The full dispenser is warmed to 21° C.

No catalyst is used. Cap 13 is replaced by a conventional foam dispenser cap in which chamber 12 and baffle 11 are omitted and upper stem 31 opens directly into foam outlet 10.

After shaking the dispenser briefly so that the Formula C mixture and propellant in chamber C are adequately blended with one another, the dispenser cap is depressed and a quantity of warm lather is dispensed at outlet 10. The temperature of the dispensed lather is 48° C. Valve 17 is rapidly and repeatedly opened and closed to dispense numerous small batches of warm lather.

I claim:
1. A dispenser, adapted for storing at least two different liquid materials in isolation from each other and for dispensing said materials simultaneously and intermittently through a common outlet, comprising:
   an outer container (A) adapted for storing a liquid under pressure and having an aperture in the wall of its upper portion in which is sealingly fastened a dispensing valve,
   said dispensing valve having an upper tubular portion communicating with a dispenser outlet and a lower tubular portion terminating inside said container,
   a tubular retainer within said container having an upper end portion within which the lower portion of said dispensing valve is sealingly and coaxially fitted, and having a lower end portion to which is sealingly attached an inner container (B) within and smaller than container (A) whereby there is provided a chamber (C) which is outside of (B) and within (A),
   said tubular retainer having an inner wall within its lower portion defining a duct which communicates with the interior of container (B), and having an inner wall above said duct defining a counterbore cavity whose bottom forms a laterally extending annular shoulder around the upper end of said duct,
   a secondary valve sealingly fitted in the bottom of said counterbore cavity and adapted to remain closed and thereby seal said duct when container (B) contains pressurized liquid except when said dispensing valve is open,
   a tubular blender sealingly and coaxially fitted in said counterbore cavity atop said secondary valve and having a vertical canal in communication with the lower tubular portion of the dispensing valve and the upper portion of said secondary valve, said blender having a lateral channel through its side wall,
   the side wall of said tubular retainer having a channel treminating inside said retainer in communication with the lateral channel of said blender and terminating outside said retainer in communication with the upper end of a tube sealingly attached to said retainer and mounted in chamber (C) so that its lower end communicates with the lower portion of chamber (C);
   the interiors of container (B) and chamber (C)—when containing pressurized liquid—being in communication with the dispenser outlet when said dispensing valve is open.
2. A dispenser according to claim 1 wherein said inner container (B) is collapsible.
3. A dispenser according to claim 2 wherein said tubular retainer comprises an upper member and a lower member, the lower portion of the upper member is coaxially and sealingly fitted within the upper portion of the lower member, and the lower end of the upper member sealingly abuts upon the upper end of said tubular blender.
4. A dispenser according to claim 2 wherein the inner wall of the lower portion of said blender defines a counterbore recess, and said secondary valve is a flexible disc which is perforated with at least one channel communicating with said counterbore recess and sealed (when the valve is closed) by said annular shoulder at the bottom of the counterbore cavity of said retainer, the lower end of said blender being in sealing and locking contact with the peripheral portion of said disc.
5. A dispenser according to claim 2 wherein the lateral channel of said blender is diametric, and the outer wall of said blender has an annular groove communicating with said channel.
6. A dispenser according to claim 2 wherein a dispenser cap provided with a dispenser outlet is sealingly and lockingly mounted on said upper tubular portion of the dispensing valve, said cap containing a chamber (D) which (1) communicates with the interior of said upper portion of the valve and with said dispenser outlet, and (2) is adapted for storage of a charge of porous material through which liquid can pass en route from said upper portion of the valve to said dispenser outlet.

(References on following page)

References Cited

UNITED STATES PATENTS

| | | | |
|---|---|---|---|
| 2,352,951 | 7/1944 | Geria | 126—263 |
| 2,741,319 | 4/1956 | Mickelsen | 222—189 X |
| 2,973,883 | 3/1961 | Modderno | 222—94 |
| 2,973,885 | 3/1961 | Ferguson. | |
| 3,045,925 | 7/1962 | Giangvalano | 239—306 |
| 3,096,001 | 7/1963 | Boe et al. | 222—135 |
| 3,181,737 | 5/1965 | Chaucer | 222—136 |
| 3,217,936 | 11/1965 | Abplanalp | 239—579 X |
| 3,240,396 | 3/1966 | Friedenberg | 222—146 |
| 3,262,609 | 7/1966 | Poitras | 239—308 X |
| 3,272,389 | 9/1966 | Frangos | 222—145 X |
| 3,281,018 | 10/1966 | Abplanalp et al. | 239—135 X |
| 3,289,949 | 12/1966 | Roth | 239—306 X |

RAPHAEL M. LUPO, *Primary Examiner.*